INVENTORS
MARCO WISMER
JOSEPH F. BOSSO

BY Chisholm & Spencer
ATTORNEYS

United States Patent Office 3,510,323
Patented May 5, 1970

3,510,323
HEAT RESISTANT INORGANIC FOAMS AND THEIR METHOD OF MANUFACTURE
Marco Wismer, Gibsonia, and Joseph F. Bosso, Lower Burrell, Pa., assignors to PPG Industries, Inc., a corporation of Pennsylvania
Filed Oct. 21, 1965, Ser. No. 500,420
Int. Cl. C04b 21/00, 35/10, 35/48
U.S. Cl. 106—41                    24 Claims

ABSTRACT OF THE DISCLOSURE

This invention relates to novel inorganic foams and their precursors and method of manufacture. Foams are formed by heating a filled polyisocyanurate foam containing a refractory pulverulent, inorganic filler, and a fluxing agent which is a compound of a metal selected from the first and second groups of the Periodic Table, at a temperature and for a time sufficient to substantially consume the organic binder to provide a coherent cellular body and the inorganic refractory particles bonded together. Alternately, the binder may be reduced to a carbonaceous state to provide a refractory material.

---

Figure 1:
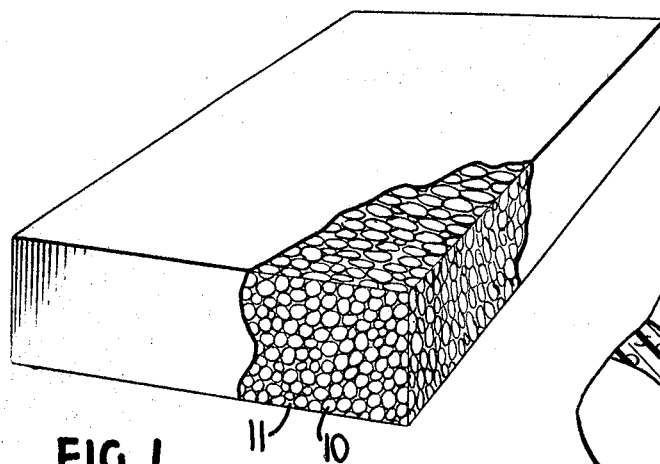

This invention relates to porous refractory foams and to the method of making such foams and also to the precursor foams in the intermediate stages, which materials also find utility as insulative materials. More particularly, this invention relates to refractory foams which were attained by heating polyisocyanurate foams which have been filled with a pulverulent, inorganic refractory material.

The foams described in this invention are adapted to adhere to substrates of metal, such as iron, steel, aluminum, alloys of metals, ceramic bodies and the like, which can be formed into bricks, slabs, or other shapes and which can be attached to or supported upon the foregoing substrates which can be used as free or unsupported bodies, for instance, as structural elements in heat-resistant walls. These foams may be utilized on structural steel or as structural steel or aluminum insulation, lining or coating of fire doors, oven doors, mufflers, heat-resistant layers in the walls of space storage vaults, ablation agents for forming the nose cones and heat shields of rockets, space capsules, catalyst carriers, filter bodies, and the like.

Among the many advantageous properties possessed by the foams of this invention, there may be enumerated the following: The foams of this invention are porous refractory materials which have a substantially uniform density and yet are relatively light in weight and possess substantialy strength, both at room temperature and at elevated temperatures; in addition, the foams of this invention may be preshaped or molded into the desired shape and/or subsequently be machined into a desired shape.

The foams contemplated by this invention combine the advantages of both organic and inorganic foams and, in fact, in the high temperature field often are superior to any of the recognized foams. One feature of the invention is in the provision of a foamable mixture comprising an organic isocyanate terminated terpolymer resin binder, a catalyst which promotes isocyanurate formation, and a blowing agent as in a conventional mixture but further containing, in an appropriate amount, and in a pulverulent state, a relatively refractory inorganic material and a flux for said refractory material. Such mixture can be spread on surfaces of varying contours and can be introduced into cavities of bodies to be filled or into molds and then foamed and cured much the same as a conventional polyisocyanurate resin foamable mixture. The mixture when cured initially is essentially an inorganic foam wherein the pulverulent refractory material is suspended or distributed with little or no cohesion between the particles thereof. In this foam the isocyanurate resin provides a foamed scaffold for the refractory material and flux, holding the same in the desired position. This organic foam, like many other conventional organic foams, has good strength and good insulative value at low or moderate temperatures. It is also resistant to permeation by moisture and by chemical agents.

However, in these foams, unlike conventional organic insulative foams exposed before or during service to temperatures sufficiently high to char the organic materials, the isocyanurate resin will be converted to a carbonaceous char which retains, at least to a large extent, the original cellular structure of the initial foam. For that reason, it is still a very good insulator even at temperatures too high to permit use of the conventional organic foam material. The charred isocyanurate resin still provides a good scaffold for the refractory material and flux.

If the charred foam is heated to a higher temperature, the charred isocyanurate resin is gradually burned out of the foam and the particles of the refractory material are united by sintering with the fluxing material to provide a coherent, strong cellular inorganic foam structure containing a substantial percentage of closed cells and wherein much of the form of the original foamed organic scaffolding is retained. This sintered foam has good insulating values at temperatures in a range far above that which has heretofore been obtained from inorganic foams or even many refractory foams.

The heating of the initial foam to affect transition through the stages of charring and the ultimate stage of burning out the charred materials to provide a coherent highly-resistant inorganic body may be effected deliberately and before the body is subjected to service.

However, in many applications the foamable mixture will be applied and foamed and cured. The resultant body will be introduced into service and the final transition to a charred coherent inorganic body is then left to the exigencies which may not actually arise and the foamed material during its entire service life will be in an initial state involving a foam wherein the organic binder is the essential element. However, in such a foam, refractory fill material will always be available to form the foam char or the final inorganic foam should conditions arise by accident or by design to induce the conversion.

Preferably, the refractory materials of the invention are prepared by heating the filled isocyanurate foam precursors under controlled conditions. For example, the foam is heated in an appropriate apparatus such as an electrically heated or gas-fired furnace whereby the organic binder is consumed, leaving its cellular char, which char serves as a scaffolding for the pulverulent refractory material. On continued heating, the char is converted to a cohesive inorganic material comprising the refractory filler, the flux and fibrous material, not at least partially fused or sintered together, to provide a rigid cellular structure which has good mechanical strength. The foams from which the organic binder have been consumed are usually of slightly lower density than the starting cellular material containing the organic binders still intact. However, especially in the case of zirconia, sometimes the refractory material has a slightly higher density than the orginal cellular material.

In order to produce the inorganic foams of this invention, it is necessary to heat their organic precursors to a temperature of at least about 1800° F., in the case of lower melting refractories such as silica, or from about 2600° F. to about 4000° F. or higher in the case of higher melting refractories such as almina and zirconia, for a time sufficient to burn out the organic resinous binder and to cause the remaining materials to be fused or sintered to coherent, substantially inorganic foam. Usually the majority of the organic scaffolding is consumed at a temperature of about 800° F. to about 1800° F.

Preferably, the filled organic foam precursor is incrementally or continuously heated from its ambient temperature to the maximum or essential temperature over a period, and in such a manner, that the temperature differential between the outer portions of the cellular body and the inner portions of the cellular body are not so great as to cause undue internal stress causing fissures, cracking, or lack of uniform structure. Preferably, the heating should not be so rapid as to cause substantial conflagration of organic binder due to attendant hot spots. Likewise, preferably, the inorganic foam is annealed after formation, that is, cooled at such a rate that undue internal stresses or thermal shock are avoided.

Many methods of heating of filled organic foam precursors may be used to produce the inorganic foams of this invention. One method involves first placing the foam in an oven, preferably having a moderate forced air flow to carry off gaseous products, the temperature then gradually raised to the desired point and the temperature is then either continuously lowered or the heating is discontinued and the oven containing the inorganic foam allowed to cool to a relatively low temperature before removing the foam.

Another method is to place a sample in an oven heated to a temperature sufficient to char the organic binder without substantial conflagration of the organic binder. Temperature is usually in the range of about 600° F. to 1200° F. After a char has been achieved, the temperature is raised to a maximum desired temperature to produce the final inorganic foam.

Still another method of firing the foam of this invention involves the use of moving bed tunnel kiln such as is utilized in the ceramics industry wherein the temperature gradient increases toward maximum in the center of the kiln. This type of kiln is ideally suited for producing the type of inorganic foams contemplated by this invention.

The resistance to heat of the foams in their final state wherein the organic material has been ablated away is surprising inasmuch as foamed glasses will fail at these temperatures, and the foams herein disclosed at least initially contain a flux along with the organic phase and the blowing agents, and the charring and burning away of the organic material at least to some extent allows interaction of the refractory filler and the fluxing agent to bind the particles of filler together. To this extent, the final product often contains glass and might be expected to fail in the same manner as conventional foamed glass and at substantially the same temperature ranges as the latter.

The refractory fillers

Many refractory inorganic materials in pulverulent state may be used as fillers in the foam. Many of these are oxides or carbides of metals. The heat resistant materials known as cermets (or the components thereof) may also be used. It will be recognized that silica ($SiO_2$) is an exceedingly common and inexpensive inorganic filler ingredient. Silica, it is to be recognized, may exist in amorphous as well as numerous crystalline states. The silica in pulverulent state, for example, of a particle size in a range of about 0.2 micron to about 550 microns or even larger, may be added to the starting organic binder. Either larger or smaller particles sizes may also be used. Pulverulent silica suitable for use in the practice of the invention may be obtained by grinding quartz or sand, or by grinding silica precipitated from sodium silicate, or by grinding so-called silica aerogel. It appears that in event the pulverulent silica is amorphous, there is a conversion or transition thereof when the foam is subjected to high temperature, for example, to the temperature of charring or ultimate burning of the organic material, and the inorganic foamed product contains crystalline silica.

While the interaction of silica and fluxing agent provides glass, examination of the final inorganic foams herein disclosed shows that a major portion of the final foam structure consists of crystalline silica. Often the glass phase is difficult to detect even by examination of the foam with an optical microscope of considerable power. However, it must be present. Usually, in the sintered material the body still contains about 90 percent to 99 percent of silica particles. The particles are sintered or bridged together by a small but largely invisible glass-like phase. In some instances, at least a part of the bond between particles may be provided by co-crystallization between the particles of refractory material.

While silica in pulverulent state and flux may be used as the filler material of applicants' foams without other refractory additives, it is also contemplated to add to, or substantially completely to replace the silica by other refractory pulverulent materials, of which the following constitutes a partial list from which selection may be made:

$Al_2O_3$
$ZrO_2$
$TiO_2$
$ThO_2$ (either commercial or nuclear grades)
$Sb_2O_3$
$ZrO_2 + SiO_2$
$ZrO_2 + TiO_2$
$TiO_2 + SiO_2$
$Al_2O_3 + SiO_2$
Tungsten oxide
$Al_2O_3 + ZrO_2$
Boron oxide
Tungsten carbide
Boron carbide
Tungsten metal
Boron metal
Calcium zirconate
Magnesium zirconate
White glass enamel (a powdered glass)
Vanadium pentoxide ($V_2O_5$)
Various natural and synthetic silicates
Eccospheres [1] "R" (alone)
Eccospheres "R" + $SiO_2$
Eccospheres "Si" (alone)
Eccospheres "Si" + $SiO_2$ Mixtures of these various refractory fillers may be used. Cermets in pulverulent forms or the pulverulent forms of the components of cermets may also be used as the refractory filler components. Fluxes may also be used with the fillers, for example, powdered nickel and lead silicate, powdered chromium with aluminum silicate, tungsten with aluminum oxide or molybdenum, and with calcium and aluminum oxides. The foregoing combinations may also include brazing agents, such as niobium, titanium, tantalum and zirconium, to bond the ceramic particles to the metal particles. These brazing agents may also be used to bond refractory coatings to metallic substrates. The preferred fillers of this invention comprise alumina and zirconia alone, in combination with each other and/or silica.

Organic or inorganic fibers, when incorporated along with the pulverulent materials above listed, have been found substantially to enhance the strength of foams, especially when they are in charred state or in the fully fired state wherein substantially all of the carbonaceous mate- ---
[1] Eccospheres = minute hollow spheres of silica.

rial has been ablated away. Appropriate refractory fibers comprise:

Asbestos
Quartz fibers
Glass fibers
Heat resistant organic fibers
Steel wire
Stainless steel wire and others. The inorganic fibers may be used in foams which are to be heated to relatively high temperatures.

Suitable refractory fibers include: asbestos, quartz fibers, glass fibers, heat resistant organic fibers, carbonaceous fibers, inorganic fibers, steel wire and stainless steel wire. Useful fibers includes those described in Chemical Week, June 9, 1962, pages 61–64; Materials in Design Engineering, October 1962, pages 12–13; and Chemical Engineering Progress, October 1962, pages 37–41.

Included among the fibrous materials described are zirconia fibers such as Zirconia A, a calcia-stabilizer zirconia; Zirconia C and Zircon, silica-containing zirconias; Fiberfrax, aluminum silicate fibers; and carbonaceous fibers such as Pluton-B, Graphite, and Hitco-C fibers.

Preferably, the fibers utilized in the compositions of this invention are selected from asbestos or alumina silicate fibers. The fibrous material may be employed in an amount in a range of about 0.25 percent to about 50 percent by weight based upon the inorganic refractory material. Usually the fibers are employed in an amount of about 1 percent by weight or higher.

Fluxes

Fluxing materials which may be used in combination with the various refractory filler materials in the foams of this invention comprise those which have heretofore been employed in the glass industry and comprise fusible compounds of metals of the first and second groups of the Periodic Table, such as:

| | |
|---|---|
| Sodium carbonate | $BaCl_2$ |
| Sodium bicarbonate | $CaCl_2$ |
| Potassium carbonate | Borax |
| Potassium bicarbonate | $CH_3COONa$ |
| Sodium hydroxide | Calcium acetate |
| Potassium hydroxide | Calcium formate |
| Calcium carbonate | Calcium borate |
| Calcium bicarbonate | $Na_2SiO_3$ |
| Magnesium carbonate | | and others. Some of these have an added capacity of reacting with acids in the foamable mixture to generate carbon dioxide, thus giving foaming action. The amount of fluxing agent is suceptible of considerable variation, dependent upon the degree of resistance to high temperature required in the products obtained, by heating the initial foams or the chars thereof to high temperatures. It is considered that most of the mixtures of filler and fluxing agent will comprise from about 1.0 percent to about 45 percent of the fluxing agent based upon the total mixture of the refractory filler and said fluxing agent; although amounts as low as 0.5 percent or even 0.2 percent in many cases may serve to some noticeable advantage.

Resins for use in the foamable mixtures

The resins which may be used in forming the foams of this invention are the class comprising isocyanate prepolymer resins, that is, the reaction product of polyols having hydroxyl values between about 100 and about 2000, with an excess of a diisocyanate to yield an isocyanate-terminated polymer called a prepolymer. Prepolymers are a well-known class of materials which have developed in the art of polyurethane foams. The formation of a prepolymer can schematically be presented as follows:

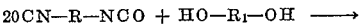

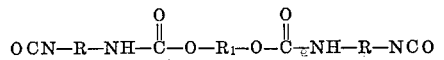

These prepolymers are preferably initially liquid. They are thermosetting upon further reaction. That is, they do not tend to melt down when subjected to heat, but rather tend to become hard. These resins will usually char or burn up without actually melting and, if subjected to sufficiently high temperature will give a carbonaceous skeleton still loaded with the pulverulent fill materials and still characterized by much of the original cellular structure. Also, they will usually adhere to substrates to which they are applied.

The prepolymers are converted into isocyanurate resins by the use of an appropriate catalyst. These catalysts are known in the art and constitute the class of catalysts which trimerize simple diisocyanates to form isocyanurates.

Polyurethane foam prepolymers are a well-known class of materials and are generally described by Saunders & Fritsch, Polyurethanes, Chemistry and Technology, Part II, Interscience Publishers, London and N.Y., 1964, pages 8–48 and 201–202. Preferably, the polyol is a polyester or polyether polyol, although other polyols suitable for mixing with diisocyanates to form prepolymers, such as nitrogen-containing polyols, may be employed. In addition, preferably the polyol has a low acid value and substantial hydroxyl value.

When a polyester is employed as a polyol, it should be soluble and liquid or fusible. Such polyesters are prepared by condensation of a dicarboxylic acid and a polyhydric alcohol.

Appropriate acids for use in the preparation of polyesters comprise dicarboxylic acids such as phthalic acid, terephthalic acid or isophthalic acid or their homologs and chloro derivatives. Still other acids such as those containing aliphatic chains may be used. Examples of such acids include succinic acid, adipic acid, sebacic acid, azelaic acid and the like. Blends of various acids may also be used. It is to be recognized that the term "dicarboxylic acid" also includes the anhydrides of the acids since the anhydrides form the same esters as the free acids. In many instances, it is preferable to work with the anhydride rather than the acid.

At least a portion of the saturated acids may be replaced by acids containing alpha-ethylenic unsaturation such as by the use of maleic acid or itaconic acid.

The polyhydric alcohol employed may be a polyhydric or dihydric alcohol. In order to obtain a rigid foam, usually a relatively high ratio of polyhydric alcohol is employed. In fact, the alcohol component may be exclusively polyhydric. Examples of polyhydric alcohols include glycerol, pentaerythritol, trimethylol ethane, trimethylol propane, mannitol, and others. Examples of dihydric alcohols include ethylene glycol, trimethylene glycol, and in some instances, polyethylene glycol of relatively high molecular weights. Blends of two or more of such alcohols may be used. Usually the alcohol is employed in substantial excess, e.g., 5 to 20 percent excess over the total of the carboxyl groups available in the reaction mixture from which the polyester is derived.

The reaction of esterification between the polyhydric alcohol and the dibasic acid components of the mixture is conducted in accordance with conventional procedure by heating a mixture, often in the presence of an inert diluent such as xylene in a reflux process to evolve and remove water. The reaction is continued until the desired viscosity and acid number are obtained. Since the preparation of such polyesters is a well-recognized art, elaboration on the mode of conducting the esterification reaction is not deemed necessary.

Another large group of polyols which are conventionally used in forming polyurethane foam prepolymers are polyether polyols. These polyether polyols are usually alkylene oxide adducts of diols, triols or higher functional alcohols. In a large number of these adducts propylene oxide is first added to the alcohol and then, if primary terminal hydroxyl groups are desired, the polyoxypropylene derivatives are "capped" with ethylene oxide.

Particularly useful polyether polyols are polyols derived by reacting an alcohol containing many functional groups, such as sucrose or sorbitol with an alkylene oxide. The formula of the sucrose polyether polyol may be represented as follows:

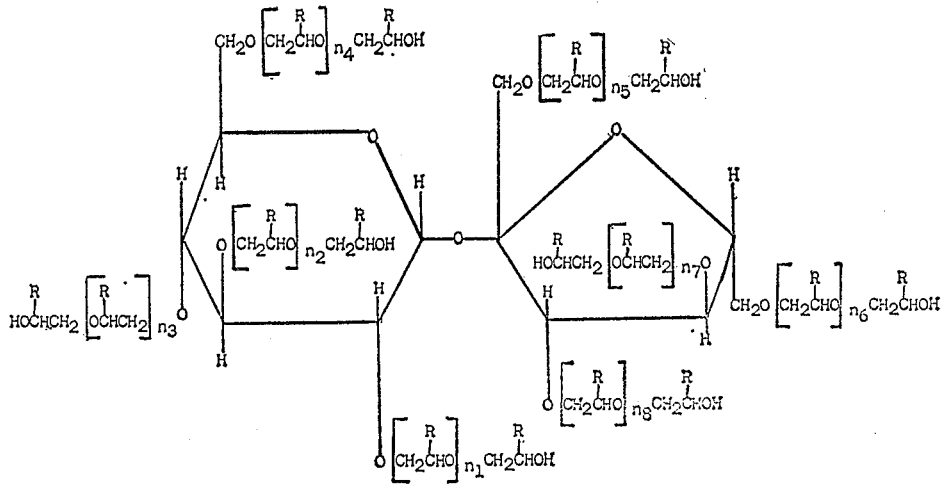

If desired, sucrose may be replaced in the preparation of the polyol by other polyols, such as sorbitol and the like polyols containing a relatively high number of hydroxyl groups. In the formula, R may be hydrogen or —$CH_3$. The symbols $n_1$, $n_2$, $n_3$, $n_4$, $n_5$, $n_6$, $n_7$ and $n_8$ are numbers from 0 to 8. The materials result from reacting about 8 to about 30 moles of an alkylene oxide, represented by ethylene oxide or propylene oxide, with sucrose. The reaction is conducted in the presence of water and in the presence of alkali, e.g., sodium hydroxide. The reaction is also conducted in an appropriate chamber at a positive pressure below about 200 p.s.i. and the alkylene oxide is bubbled into the mixture. Bubbling is continued until the selected amount of alkylene oxide within the foregoing range has reacted. The reaction temperature is about 70° F. to 270° F. The products are liquids and have molecular weights of about 700 to 1800 and hydroxyl numbers of about 300 to about 700. In many instances, minor amounts, e.g. 1 to 15 percent by weight based upon the total polyol of a low molecular weight polyhydric, such as trimethylolethane, pentaerythritol, or the like, may be added to reduce viscosity of the mixtures. Polyether polyols as prepolymer foamation are generally described by Gaylord, Polyethers High Polymer Series, vol. XIII, Part I, Interscience Publishers, N.Y. and London, 1963.

The prepolymer is made by mixing the polyol component with a wide variety of diisocyanates in such amounts as to provide substantial excesses of dissocyanate molecules as compared with available hydroxyl groups. Examples of such isocyanates include chlorophenyl-2,4-diisocyanate, ethylene diisocyanate, 1,4-tetramethylene diisocyanate, para-phenylene diisocyanate, toluene diisocyanate (usually a mixture of isomers), para,para' diisocyanate diphenylmethane and hexmethylene diisocyanate, among others.

In preparing a prepolymer of a polyol and a diisocyanate, it is preferable that the polyol and the diisocyanate be proportioned depending upon the available hydroxy groups of the polyol. Usually the diisocyanate will be employed in the ratio to provide about .90 to about 2.2 moles of diisocyanate per equivalent of combined hydroxyl and carboxyl in the polyol prepolymer component. The reaction of the polyol and the diisocyanate may be conducted in the presence or the absence of a catalyst. The formation of polyurethane prepolymers and the methods employed are well known in the art and it is not deemed necessary to set forth these conditions in detail.

The isocyanurate foams which comprise the organic binders utilized to form the refractory foams of the instant invention are prepared by foaming a polyurethane foam prepolymer in the presence of a trimerization catalyst in order to prepare isocyanurate foams. That is, when the prepolymer is formed into a thermoset, crosslinked network containing repeating groups which can be idealized as:

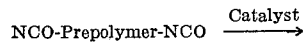

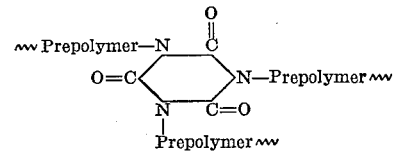

Polyisocyanurate foams are known in the art. For example, methods of preparing isocyanurate foams are described in U.S. Pat. 2,993,870, U.S. Pat. 3,154,520 and U.S. Pat. 3,180,846, as well as being described by Nicholas et al., Journal of Cellular Plastics, January 1965.

The catalysts employed to trimerize isocyanates to form isocyanurates may be selected from those known in the art. Generally those compounds which trimerize molecular isocyanates to form simple isocyanurates have shown some activity in polymerizing macromolecular isocyanates to form polyisocyanurates. Catalysts which have shown in the art to have activity in polymerizing and trimerizing isocyanates include triethylphosphine, epoxides, amines, salts of weak organic acids, acidic catalysts such as aluminum chloride and oxalic acid, quanternary hydroxides of nitrogen, phosphorus, arsenic and antimony and alkali metal alkoxides. Epoxides are particularly effective in the presence of tertiary amines. Catalysts which have been found particularly effective in preparing polyisocyanurate foams include: 2,4,6 tris(dimethylaminomethyl) phenol; mixture of ortho and para-dimethylaminomethyl phenol; N,N',N" tris(dimethylaminopropyl) sym-hexahydrotriazine; N,N',N" tris(dimethylaminopropyl) sym-hexahydrotriazine; and diglycidyl ether of bisphenol; A(para,para'-isopropylidenediphenyl); benzyl trimethylammonium hydroxide in dimethyl sulfoxide (as 25 percent solution; benzyl trimethylammonium methoxide; sodium methoxide in dimethyl formamide (as saturated solution); N,N',N" - tris(3-dimethylamino-propyl)-sym-hexahydrotriazine; and N,N',N"-trialkyl-sym-hexahydrotriazine/tertiary aliphatic amines.

In order to improve the foaming characteristics of the foregoing resinifiable components, additives are often included. One of these comprises an emulsifier or surfactant such as are disclosed in the publication entitled "Detergents and Emulsifiers—Up to Date (1960)," published by John W. McCutcheon, Inc., 475 Fifth Ave., New York, N.Y. These surfactants are used in relatively small amounts, for example, about 0.1 percent to about 3 percent based upon the organic components of the mixture. The surfactants may be non-ionic, anionic, cationic, or mixtures of two or more thereof. A representative member of the family is known as Tween 20 or Tween 21 and is described as polyoxyethylene sorbitant monolaurate. An example of a cationic surfactant comprises Hyamine 1622, which is described as diisobutyl phenoxy ethoxy ethyl dimethyl benzyl ammonium chloride. The several classes of surfactants may be used singly or in combination.

Examples of surfactants which may be used include the so-called Pluronics which have been described as being condensates of ethylene oxide with a hydrophobic base formed by condensing propylene oxide with propylene glycol. These are of a molecular weight in a range of about 2000 to 8000 and are ascribed the formula $$HO(C_2H_4O)_a(C_3H_6O)_b(C_2H_4O)_cH$$

Members of this family are designated as L–61; L–44; L–62; L–64; P–75; F–68; P–84.

Another class of surfactants comprises the so-called Tetronics, which are formed by the addition of propylene oxide to ethylene diamine, followed by the addition of ethylene oxide. These compounds have been ascribed the formula:

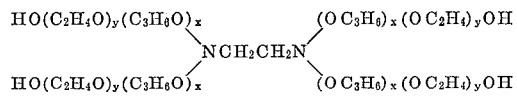

Another of the more satisfactory surfactants which has been found very effectively to maintain the cell structure in the foaming and curing of the instant foams comprises derivatives of the silicones. One such product is approximately of the formula:

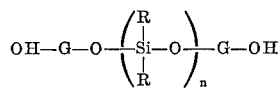

wherein G is the alkylene radical of a lower glycol, such as ethylene, propylene or butylene, and groups R are alkyl or hydroxy-substituted alkyl containing from 1 to about 4 carbon atoms, and $n$ is a number from 1 to about 20. It is a liquid product having a viscosity of 550 centiposes, refractive index of 1.4435, and a specific gravity at 25° F. of 1.02. One such material is sold as Dow-Corning 199. Still another highly useful silicon base surfactant comprises the so-called X–521 which has the structural formula:

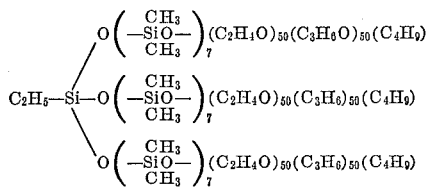

as well as L–5310, which is an organo-silicone block copolymer having a formula:

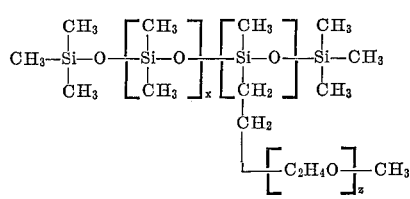

being a soft wax, having a melting point of 32° C.–35° C., a viscosity of 200–400 centistokes, a cloud point (1 percent water solution) of 64° C., and a specific gravity of 1.07 (35°/25° C.). The invention also includes the formation of filled foams in the substantial absence of surfactants. If surfactants are used, the amount thereof may be in a range of about 0.1 percent to about 5 percent based upon the total of the resinifiable components in the mixture.

Blowing agents

The term "blowing agent" is used to designate various agents that will produce a cellulated froth or foam-like body. For example, air or other fixed gas may be introduced by beating or by compression to produce foaming. Therefore, under the provisions of this invention, it is termed "a blowing agent." Volatile compounds, such as $CCl_3F$, may also be termed blowing agents, as may such chemicals as ammonium carbonate or nitrate, or diazoaminobenzene, which will decompose in the mixture to give foaming. These, under the terms of this invention, are blowing agents.

This invention includes the addition of a gas, such as carbon dioxide, nitrogen, argon, helium or air, to a polymerizable mixture under a considerable pressure so that a substantial amount thereof goes into solution. When the pressure is released, the gaseous medium in solution volatilizes to produce foam formation. The organic material is then cured.

Another method of blowing comprises reacting a portion of the isocyanate groups contained in the polymer mixture with water to generate carbon dioxide in situ.

Still other systems of blowing may be used. For example, the mixture may be subjected to an appropriate frothing operation as by whipping with carbon dioxide gas, air or nitrogen. A relatively volatile chlorofluorocarbon, such as $CCl_3F$, $CCl_2F_2$, or other similar agents, or a combination thereof with carbon dioxide or similar gaseous blowing agents may be introduced into the resin-filler mixture and allowed to foam and set to solid state. When the volatile chlorofluorocarbons are employed to produce foaming action, it is preferable that the foamable mixture be prechilled to a temperature of about 50° F. or to such other temperature as will effectively maintain the blowing agent in solution in the mixture. When the mixture is allowed to warm up in curing, the halocarbon volatilizes to provide a suitable foam structure containing the filler material in suspension therein.

In the formulation of foams in accordance with the provisions of the present invention, various isocyanate-terminated prepolymers and mixtures thereof may be employed. The following constitute examples illustrating a few prepolymers and mixtures that may be used in the practice of this invention.

EXAMPLE A

A polyester was prepared as follows:

| | Parts by weight, grams |
|---|---|
| Diethylene glycol | 360.00 |
| Adipic acid | 992.00 |
| Stannous fluoride (catalyst) | 0.12 |
| Trimethylolpropane | 1002.00 |

The diethylene glycol, adipic acid, and stannous fluoride were weighed into a reaction vessel equipped with stirrer, thermometer, reflux condenser, glycol recovery column, inert gas sparge, and heating mantle. The mixture was stirred and heated at 195–205° C. until an acid value of about 330 was achieved. Upon reaching an acid value of 330, the trimethylolpropane was added and this material was stirred and heated at 220° C. until an acid value of 20 was achieved. The inert gas sparge was then increased, the glycol recovery column removed and the material was blown at 220° C. until an acid value of 1.5 or less was obtained. A viscous resin was obtained as the product.

Percent yield—96.0
Acid value (final)—0.25
OH value—367.5
Brookfield viscosity @ 25° C.—31,500 centiposes
Gardner color value—3
This was designated "Polyester A."

Into a reaction vessel equipped with a stirrer, thermometer, reflux condenser and heating mantle was charged 1500 parts toluene diisocyanate, 176.5 parts of the above Polyester A were added incrementally over a period a period of 20 minutes. 88.3 parts of trimethylolethane were added, the pot temperature at this point being 57° C. The temperature was raised over a period of one hour to 92° C. The reaction mixture was then heated at 85° C. for an additional 1.5 hours. There was a small amount of solid material in the flask which was filtered off. The prepolymer had a NCO value of 127.3 (theoretical 127.5). This prepolymer is hereinafter referred to as "Prepolymer A."

EXAMPLE B

A sucrose-based polyether polyol and a prepolymer thereof were prepared utilizing the process taught by Wismer et al. in U.S. Pat. 3,152,002, which in incorporated herein by reference. The polyether polyol contained 1 mole of sucrose, 11 moles of propylene oxide and 4 moles of ethylene oxide. The polyol had a hydroxyl value of 460, and a viscosity of 28,000 centipoises at 25° C. The prepolymer was formed by reacting 78.5 parts by weight of toluene diisocyanate (which was a mixture of 80 percent of the 2,4 isomer and 20 percent of the 2,6 isomer) and 21.5 parts by weight of the above sucrose-based polyether polyol. The resultant prepolymer had an NCO equivalent of approximately 140 and a viscosity of 1500 centipoises. The prepolymer is hereinafter referred to as "Prepolymer B."

The following examples illustrate the composition methods practices for producing the inorganic foams of the invention but the invention should not be construed as being limited to the details hereinafter set forth. All parts, percentages and ratios throughout this specification are by weight unless otherwise indicated.

EXAMPLE I

The following base mixture was prepared.

| Base mixture: | Parts by weight |
|---|---|
| Prepolymer A (same as Example A) | 200.0 |
| Surfactant (organopolysiloxane) | 2.0 |
| Refractory filler ($SiO_2$) | 202.0 |
| Asbestos fibers | 8.6 |
| Flux ($NaHCO_3$) | 34.0 |

A foamable mixture was formed as follows.

| Foamable mixture: | Parts by weight |
|---|---|
| Base mixture (above) | 446.6 |
| Trichlorofluoromethane (blowing agent) | 6.0 |
| Catalyst (1/1 mixture of 2,4,6-tris(dimethylaminomethyl)phenol: diglycidyl ether of para,para'-isopropylidenediphenol) | 3.6 |

The base mixture was placed on an air stirrer and the blowing agent added and the mixture stirred until a uniform consistency was obtained. The catalyst was then added and the mixture stirred for one minute. The mixture was then poured into a 5″ x 5″ x 2½″ mold and placed in an oven at 300° F. for 30 minutes.

The filled foam had a density of 34 pounds per cubic foot. The foam was fired in an electric tunnel kiln over an 8 hour cycle, being exposed to a maximum temperature of 1200° F. for about 60–75 minutes to produce a foam char having a density of 13.7 pounds per cubic foot. The foam retained most of its original shape and fine cell structure.

EXAMPLE II

The following base mixturew as prepared.

| Base mixture: | Parts by weight |
|---|---|
| Prepolymer A (same as Example A) | 714.0 |
| Surfactant (organopolysiloxane) | 7.15 |
| Refractory filler ($Al_2O_3$) | 1036.0 |
| Aluminum Silicate fibers | 43.8 |
| $NaHCO_3$ | 15.8 |

The above materials were mixed with an air stirrer until a uniform consistency was obtained.

A foamable mixture was then prepared as follows.

| Foamable mixture: | Parts by weight |
|---|---|
| Base mixture (as described above) | 1600.0 |
| Trichlorofluoromethane (Freon 11B) | 32.0 |
| Catalyst (1/1 mixture of 2,4,6-tris(dimethylaminomethyl)phenol: diglycidyl ether of para,para'-isopropylidenediphenol) | 12.8 |

The base mixture and Freon were blended well and the catalyst then added. The mixture was stirred for one minute and poured into a mold 9″ x 5″ x 4″ and allowed to foam at room temperature. A cover was placed on top of the mold and held securely in place. The foam completely filled the mold.

The brick formed was post-cured at 200° F. for 4 hours. The filled foam had a density of 36.2 pounds per cubic foot and had a fine, uniform cell structure.

The brick was then fired in a moving bed tunnel kiln at a maximum temperature of 2800° F. The fired foam had a density of 34.3 pounds per cubic foot and was a strong refractory material which retained its original fine cell structure.

EXAMPLE III

The following base mixture was prepared.

| Base mixture: | Parts by weight |
|---|---|
| Prepolymer B (same as Example B) | 1428.0 |
| Surfactant (organopolysiloxane) | 14.3 |
| Refractory filler ($SiO_2$) | 1785.0 |
| Asbestos fibers | 76.0 |
| $NaHCO_3$ | 300.5 |

The above materials were mixed with an air powered stirrer until a uniform consistency was obtained.

A foamable mixture was then prepared as follows.

| Foamable mixture: | Parts by weight |
|---|---|
| Base mixture (as described above) | 450.0 |
| Trichlorofluoromethane | 5.0 |
| Catalyst (1/1 mixture of 2,4,6-tris(dimethylaminomethyl)phenol: diglycidyl ether of para,para'-isopropylidenediphenol) | 3.7 |

The blowing agent and catalyst were premixed and then added to the base mixture and stirred for 90 seconds. The material was then poured into a 5″ x 5″ x 2¼″ mold. The mold was placed in an oven at 200° F. for thirty minutes and then allowed to cool. The filled foam had a density of 32.6 pounds per cubic foot.

The filled foam was fired in an electric tunnel kiln passing from room temperature to a mixamum temperature of 1200° F. and back to room temperature over an 8 hour cycle. The resultant char was strong and had retained most of its original cell structure.

EXAMPLE IV

This example shows the preparation of the foams of this invention employing water to generate carbon dioxide, in situ, as a blowing agent.

| Base mixture: | Parts by weight |
|---|---|
| Prepolymer A (same as Example A) | 1428.0 |
| Surfactant (organopolysiloxane) | 14.3 |
| Refractory material ($Al_2O_3$) | 2072.1 |
| Aluminum silicate fibers | 87.5 |
| $NaHCO_3$ | 31.5 |

The above were mixed until uniform.

A foamable mixture was then prepared as follows.

| Foamable mixture: | Parts by weight |
|---|---|
| Base mixture (above) | 1600.0 |
| Catalyst (1/1 mixture of 2,4,6-tris(dimethylaminomethyl)phenol:diglycidyl ether of para,para' - isopropylidenediphenol) | 12.8 |
| Water | 1.6 |

The base mixture was placed in a container and then the catalyst added. The mixture was stirred for 1 minute. The water was added and the mixture stirred for 15 seconds. The mixture began to foam and was immediately poured into a 9" x 5" x 4" mold. The material foamed up to fill the mold.

The filled foam had a density of 31.0 pounds per cubic foot. It was a strong foam.

The filled foam was fired in a moving bed tunnel kiln over a 16 hour cycle, being exposed to a maximum temperature of 2850° F. for about 100–125 minutes. The product was a strong refractory foam with a density of 25.4 pounds per cubic foot which has a few superficial external cracks.

EXAMPLE V

This example shows the preparation of a foam similar to the foam of the instant invention where the catalyst which promotes isocyanurate group formation was not employed and where the resin binder is essentially a polyurethane.

The following formulations were made.

| Premix I: | Parts by weight |
| --- | --- |
| Prepolymer A (as in Example A) | 1364.0 |
| Surfactant (organopolysiloxane) | 28.6 |
| Refractory filler ($Al_2O_3$) | 1950.0 |
| Aluminum silicate fibers | 83.4 |
| $NaHCO_3$ | 30.0 |

| Premix II: | |
| --- | --- |
| Polyester A (as in Example A) | 1492.0 |
| Refractory filler ($Al_2O_3$) | 2194.0 |
| Aluminum silicate fibers | 91.6 |
| $NaHCO_3$ | 33.0 |

A foamable mixture was prepared as follows.

| Foamable mixture: | Parts by weight |
| --- | --- |
| Premix I (above) | 765.0 |
| Premix II (above) | 835.0 |
| 2,4,6 - tris(dimethylaminomethyl)phenol | 1.9 |
| Water | 1.6 |

The resin compositions were mixed and the phenol compound added and stirred for 45 seconds. The water was then added and the mixture stirred for 30 seconds and then poured into a 9" x 5" x 4" mold and allowed to foam. The foam completely filled the mold. The filled foam had a density of 27.5 pounds per cubic foot.

The sample was fired in a moving bed tunnel kiln over a 16 hour cycle, having a maximum temperature of 2850° F. The refractory produced had many deep external cracks and a cross section revealed that much of the original cell structure had collapsed or been destroyed.

Thus, it has been clearly shown that trimerization of the isocyanate groups yields far superior refractories as compared to the refractories of the instant example where the resin binder is believed to consist chiefly of a polyurethane backbone.

The inorganic foams of this invention, although cellular in nature, are very strong mechanically and have a high resistance to heat transmission. They have been found to have such high heat resistance that they can withstand temperatures of 5000° F. or even 10,000° F. for a considerable period of time.

The foamed bodies in either the unfired state or the fired inorganic state may be cut by grinding or other means to provide regular and/or accurately formed shapes suitable for uses wherein accuracy as to size or shape of the parts is required.

Blocks or slabs of the inorganic foams of this invention may be laid up in the conventional manner to provide a wall or a coating for a wall or other assemblage to provide high heat resistance; likewise blocks or slabs of the foams disclosed herein may be placed between two panels, such as between the interior and exterior walls of a vault or safe to provide an assemblage which has high heat resistance and low thermal conductivity.

Not only may the foams of this invention be molded in the form of bricks or slabs, but if desired, the foam of this invention may be molded or shaped into more intricate bodies such as hollow cylinders or cones. One important utility for hollow cylindrical or ellipsodial bodies is as a liner for mufflers or pipes through which pass hot gases. Molded conical shapes may be machined to serve as nose cones on ballistic missiles.

If desired, the inorganic foams of sintered refractory material and fluxing agent, containing little or no organic material, may be post-impregnated with thermosetting resin components or with a fused or dissolved resin in order to fill or partially fill the open cells thereof to impart ablation properties. After the organic matter is ablated away, the original inorganic foam remains to provide insulation at high temperatures. Appropriate impregnating resins may comprise phenol-formaldehyde resins, epoxy resins and resins which are interpolymers of a monomer, such as styrene, and a polyester of a glycol and an anhydride of an alpha, beta-ethylenic dicarboxylic acid.

The resins or their components in the liquid stage may be caused to more fully fill the cells of the inorganic foam by application of fluctuating pressures, for example, by subjecting the foam while partially or completely immersed in resin or mixture, alternately to vacuum and atmospheric or super-atmospheric pressure. Resin may also be allowed to immerse an inorganic foam which is under vacuum. The resin can readily flow into the evacuated cells and the tendency will be increased when the vacuum is released.

For a better understanding of the invention, reference may now be had to the drawings. FIG. 1 is an isometric view of a slab or block of a heat resistant foam formed in accordance with the provisions of this invention. In the unfired state where 10 represents the cells of the foamed material, 11 represents the thermosetting resin binder containing dispersed therein the refractory filler and the fibrous material. After the foam has been fired in accordance with the method of this invention, referring again to FIG. 1, 10 represents the cells of the foam and 11 represents septa comprising sintered particles of the refractory filler which may be interspersed therein the fibrous material which remains after the firing is complete.

Figure 2:
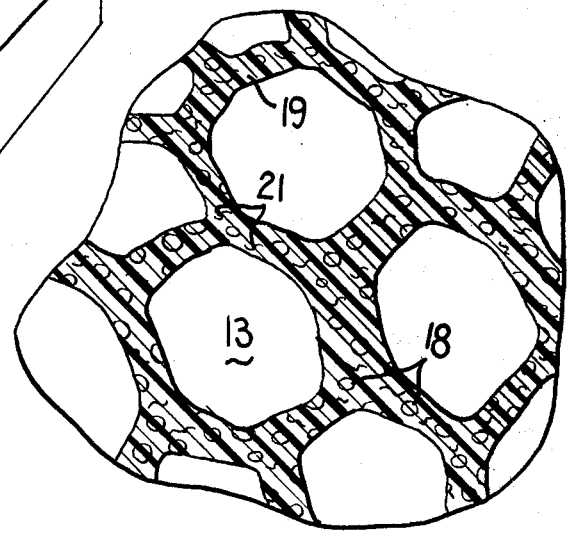
Figure 3:
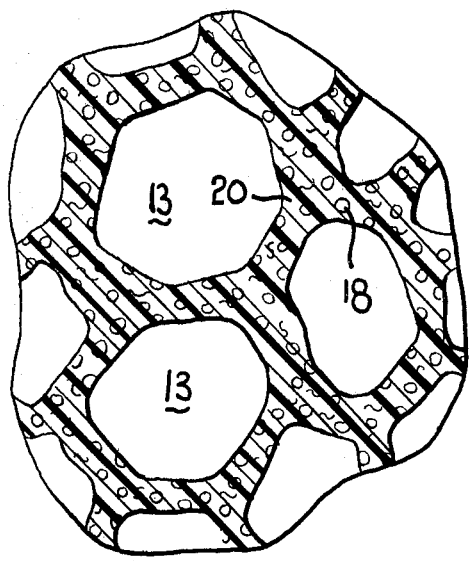

FIGS. 2 and 3 approximately illustrate the character of the cells and the walls thereof. Septa 12 are disposed between cells 13 of the foamed body. The organic binder 19 of the foam is indicated as being intact and the particles 18 of the refractory and the fibrous material 21 are randomly dispersed and embedded therein.

The firing is attended by volatilization and some degree of combustion of the organic binder. The volume filled by the organic material is thus reduced and as a result, will be apparent by comparison of FIGS. 2 and 3, wherein 10 represents the charred organic binder, there will be a shrinkage of the volume of the foamed body, whereby the particles of refractory material are allowed to approach each other.

Figure 4:
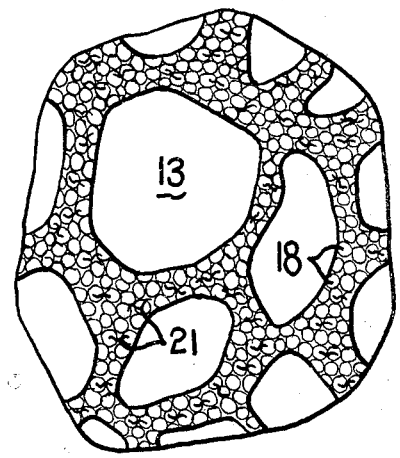

When the firing is complete, as illustrated in FIG. 4, the septa between the cells will comprise contiguous particles of refractory oxide at least some of which sintered together at the points of contact to provide a strong, rigid inorganic foam, having dispersed through the substantial inorganic refractory septa, fibrous material which remains intact when the firing is complete.

Figure 5:
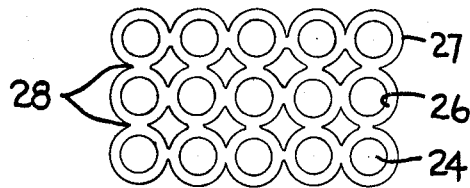

When a fluxing agent for the refractory oxide, as hereinabove described, is present in the composition of this invention, as the organic binder is consumed and the refractory filler particles become contiguous, there is an interaction between the filler particles and the fluxing agent. The resultant interaction is stylized in FIG. 5.

Where cores 24 of unchanged refractory material are encased in glass-like shells 26, thus providing composite, two-phase particles 27. The glass-like phases constituting the outer shells of the composite particles, while the latter are hot, will cohere as to points of contact 28, thus providing a second substantially continuous scaffold phase and providing a strong refractory and chemically resistant bond. There may be a tendency of the hot fluxed material to be drawn by capillarity between contiguous particles where they are in contiguity. This results in attenuation of the fluxed material over the main portions of the particles.

Where the fluxing agent is present, the resultant inorganic structure is generally a combination of refractory filler particles directly sintered together and refractory fillers sintered together through the interaction with the fluxing agent, especially where low levels of fluxing agent are present.

The inorganic foamed material disclosed herein may also serve as catalyst carriers for high temperature reaction, either by incorporating the active catalyst such as $V_2O_5$ as a minor portion of the refractory filler, or by post-treating the inorganic foam with a solution of the catalyst thereby impregnating the inorganic foam with the catalyst.

While specific examples of the invention have been set forth hereinabove, it is not intended to limit the invention solely thereto, but to include all of the variations and modifications falling within the scope of the appended claims.

What is claimed is:

1. A method of forming a refractory foam which comprises heating a composition comprising: (A) a foamed, thermoset isocyanurate resin formed by foaming an isocyanate group terminated polyurethane prepolymer in the presence of a catalyst which, in turn, promotes isocyanurate group formation, having dispersed therein (B) a refractory pulverulent inorganic filler and (C) a fluxing agent which is a compound of a metal selected from the first and second groups of the Periodic Table, at a temperature and for a time sufficient to substantially consume the organic binder to provide a coherent cellular body having the inorganic refractory particles bonded together at points of contact.

2. The product of the process of claim 1.

3. A process as in claim 1 where the foam contains in addition (D) a heat resistant fibrous material.

4. The product of the process of claim 3.

5. A process as in claim 1 where the refractory inorganic filler is refractory metal oxide.

6. The product of the process of claim 5.

7. A process as in claim 3 where the refractory inorganic metal oxide is selected from the group consisting of alumina, zirconia, and mixtures of alumina and zirconia; alumina and silica; zirconia and silica; and alumina, zirconia, and silica.

8. The product of the process of claim 7.

9. A process as in claim 7 wherein the fluxing agent is selected from the group consisting of alkali metal and alkaline earth metal, carbonates and bicarbonates, oxides, hydroxides and carboxylic acid salts.

10. The product of the process of claim 9.

11. A process as in claim 9 where the refractory inorganic filler is alumina.

12. The product of the process of claim 11.

13. A method of forming a refractory foam which comprises heating a composition comprising: (A) a foamed thermoset isocyanurate resin formed by foaming an isocyanate group terminated polyurethane prepolymer in the presence of a catalyst which in turn promotes isocyanurate group formation having dispersed therein (B) a refractory pulverulent inorganic filler and (C) a fluxing agent which is a compound of a metal selected from the first and second groups of the Periodic Table, above the charring temperature of the resin to provide a foamed char containing the refractory particles imbedded therein.

14. The product of the process of claim 13.

15. A process as in claim 13 where the foam contains in addition (D) a heat resistant fibrous material.

16. The product of the process of claim 15.

17. A process as in claim 13 where the refractory inorganic filler is a refractory metal oxide.

18. The product of the process of claim 17.

19. A process as in claim 15 where the refractory inorganic metal oxide is selected from the group consisting of alumina, zirconia, and mixtures of alumina and zirconia; alumina and silica; zirconia and silica; and alumina, zirconia and silica.

20. The product of the process of claim 19.

21. A process as in claim 19 wherein the fluxing agent is selected from the group consisting of alkali metal and alkaline earth metal, carbonates, bicarbonates, oxides, hydroxides and carboxylic acid salts.

22. The product of the process of claim 21.

23. A process as in claim 21 where the refractory inorganic filler is alumina.

24. The product of the process of claim 23.

References Cited

UNITED STATES PATENTS

| | | | |
|---|---|---|---|
| 3,175,918 | 3/1965 | McGahan et al. | |
| 3,281,261 | 10/1966 | Lynch | 264—44 XR |
| 3,285,873 | 11/1966 | Bailey | 264—44 XR |
| 3,345,440 | 10/1967 | Googin et al. | 264—29 |
| 3,387,940 | 6/1968 | McHenry et al. | 264—44 XR |
| 3,301,785 | 1/1967 | Ratliff et al. | 252—62 |

OTHER REFERENCES

U.S. Office of Technical Services, Department of Commerce, "Development of Non-oxide Refractory Foams," by Ian M. Logan et al., The Carborundum Co., Wadd Technical Report 60–124. Wright Air Development Div., Air Research and Development Command, U.S. Air Force, Wright-Patterson Air Force Base, Ohio, April 1960, all pages.

PHILIP E. ANDERSON, Primary Examiner

U.S. Cl. X.R.

106—65; 161—159; 252—62; 260—2.5; 264—29, 44, 54